United States Patent
Sacalis

[11] 3,842,539
[45] Oct. 22, 1974

[54] METHOD AND DEVICE FOR INCREASING THE LIFE OF CUT FLOWERS

[76] Inventor: John Nicholes Sacalis, P.O. Box 231 College of Agriculture & Environmental Science Dept. of Horticulture & Forestry Rutgers University, East Brunswick, N.J. 08903

[22] Filed: Nov. 12, 1973

[21] Appl. No.: 414,729

[52] U.S. Cl. .................... 47/58, 47/DIG. 2, 71/2.4
[51] Int. Cl. ..................... A01g 5/06, A01n 3/02
[58] Field of Search .......... 47/58, DIG. 2; 71/2.4

[56] References Cited
UNITED STATES PATENTS
2,805,137  9/1957  Clopton .................. 71/2.4
2,856,276  10/1958  Weinstein ............... 71/2.4

Primary Examiner—Robert E. Bagwill
Attorney, Agent, or Firm—Cooper, Dunham, Clark, Griffin & Moran

[57] ABSTRACT

Method of preserving and/or increasing the life of a cut flower, such as a rose, the stem of which is immersed in water includes placing the basal end of the the flower stem in a conduit or tube containing a water-porous, ion exchange resin mass and which is disposed between the stem's basal end and the water. The water enters the basal end after passage through the resin mass. The ion exchange device reduces physiological blockage of the water-conducting tissue and aids in retention of fresh weight of the flower.

5 Claims, 3 Drawing Figures

PATENTED OCT 22 1974 3,842,539
Fig. 1.
Fig. 2.
Fig. 3.
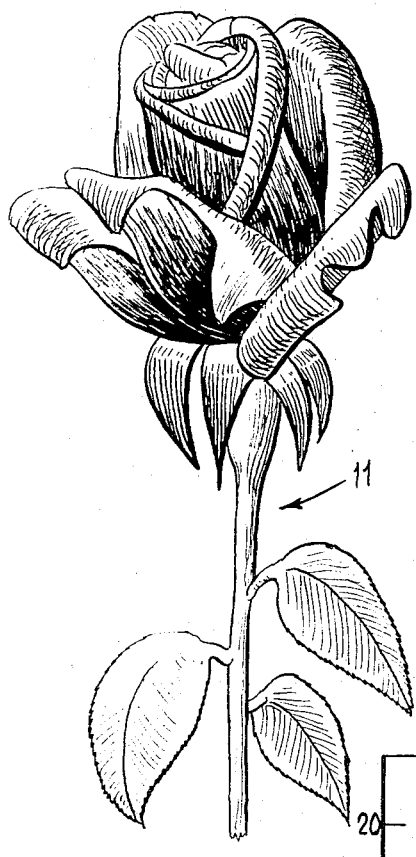
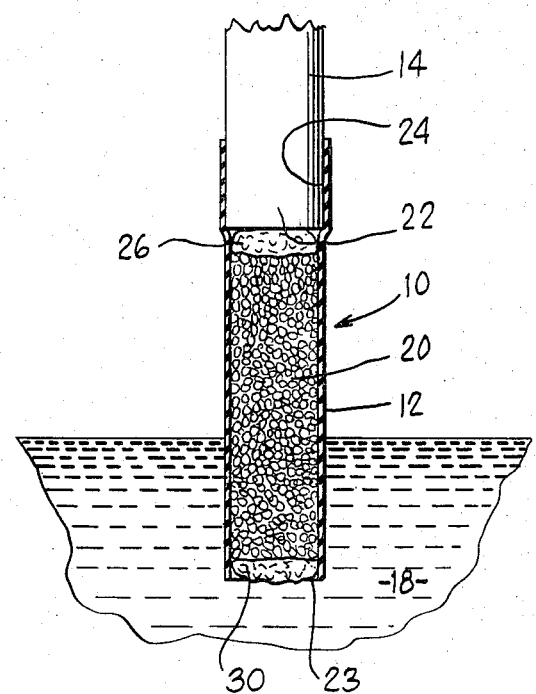
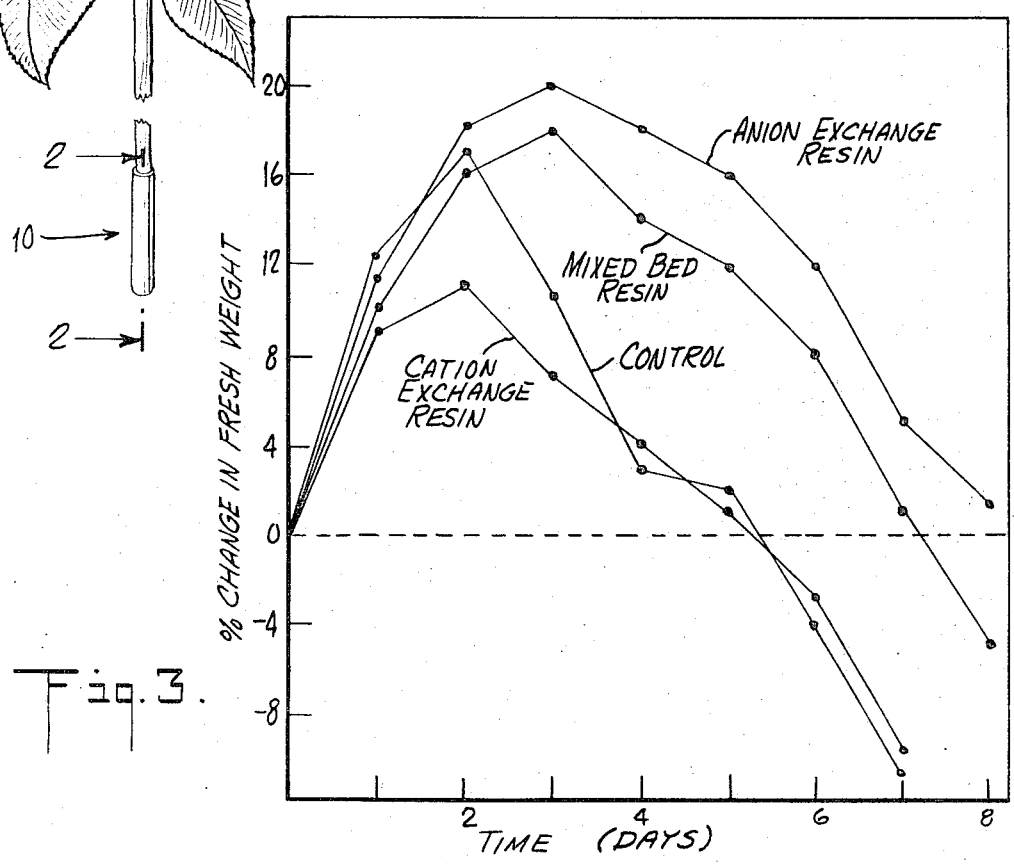

METHOD AND DEVICE FOR INCREASING THE LIFE OF CUT FLOWERS

BACKGROUND OF THE INVENTION

The present invention relates to a method of preserving and/or increasing the life of a cut flower, such as a rose, the stem of which is immersed in water. The invention further relates to a device useful in carrying out the method.

Preserving and/or increasing the life of cut roses is especially troublesome to floraculturists, nursery men and commercial florists. Roses typically are transferred through a chain of distribution and are kept for a period of time before being sold and delivered to a customer. Nevertheless, when the customer purchases the flowers and places them in a vase, the customer expects that the flowers will last for a reasonable period of time and that during that time they not wilt or develop a condition known as "bent neck". Unfortunately, when roses have been cut and stored for several days, particularly in hot summer weather, the buds often fail to open. Also, their shelf life is quite short. In addition, if the customer purchases flowers in full bloom, they may wilt almost immediately.

Many products are commercially available for preserving and enhancing the natural appearance of cut flowers, such as roses. These products typically take the form of additives to water in which the cut flower stems are placed. For example, in U.S. Pat. No. 3,328,157, the cut flower stem, particularly a rose, is inserted in an aqueous solution of dimethyl sulfoxide. In U.S. Pat. No. 2,805,137, the preservative comprises an aqueous composition of a phenol, e.g. phloroglucinol, a compound selected from the group consisting of carbonyl-containing compounds and compounds capable of being catabolized by plant enzymes to a carbonyl-containing compound and which are utilizable by cut flowers and other portions of plants as an energy source, e.g., a disaccharide such as sucrose, and a compound selected from the group consisting of hydrazines, amines and quaternary ammonium compounds and which have antiseptic properties, e.g. hydrazine sulfate. One such additive is currently being sold in powder form under the trademark "Floralife" by Floralife, Inc.

Others have attempted to preserve freshly cut flowers by placing the flower stems in a moisture-retaining substance, such as sphagnum moss, natural sponge, absorbent cotton, sponge rubber, urea-formaldehyde foam, or phenol-formaldehyde foam. See for example, U.S. Pat. No. 2,753,277.

Still others have sought to stimulate plant growth and health by changing the pH level of the water. This has been attempted by adding a cation exchange resin and lime to the water. See for example, U.S. Pat. No. 3,501,402.

These methods are sometimes used in conjunction with refrigeration, but none of these methods are believed to be particularly effective. Use of the various solutions and devices described above has not ameliorated the problem. Heretofore, there has been no inexpensive method and device for effectively increasing the shelf life of cut flowers such as roses.

SUMMARY OF THE INVENTION

It is an object of the invention to provide an effective method of preserving and/or increasing the life of cut flowers, such as roses, in water, and preventing early wilting and "bent neck."

It is a further object of the invention to provide an inexpensive method and disposable device for increasing the life of roses after they have been cut for a period of time substantially exceeding the normal cut life of untreated flowers.

To these and other ends, the present invention contemplates a method of preserving and/or increasing the life of a cut flower the stem of which is immersed in water. The method includes the steps of placing the basal end of the lower stem in a device which includes a water-porous, ion exchange resin mass and locating the device in water, such that water must pass through the resin in the device into the flower stem. The device and the resin inhibit the passage of water into the flower stem and remove harmful ions from the water. 0

Vascular blockage may be one of the primary causes of "bent neck" in cut roses. Plugging of the vascular tissue occurs naturally, either in the presence or absence of bacteria. It is most desirable to prevent this plugging of the vascular tissue in order to increase the cut life of the flower. Physiological blockage of the water-conducting tissue, as ascertained by water flow measurements through excised stem sections, has been significantly reduced by the device of the present invention. Early wilting and "bent neck" are effectively ameliorated.

The device consists of a flexible tube open at both ends. One end is adapted to receive the basal end of the flower stem, and the opposite end is disposable in water. A water-porous, ion exchange resin mass, which is preferably an anion exchange resin column, but may also be a mixed bed resin, is disposed within the tube. Thus, water must pass though the constricted area defined by the tube and through the resin before entering into the stem's basal end. The ion exchange resin removes a harmful ion or ions from the water. As the tube is made of a flexible material, it is capable of grasping and securely holding the stem when attached to its basal end. A restriction, such as gauze, is placed at both ends of the tube to maintain the resin therein. The gauze also inhibits passage of water into the tube.

It has been found that by mixing a floral preservative, such as a mixture of a sugar and a bacteriacide, into the water, vase life of the flower is increased when used in conjunction with the device of the present invention.

BRIEF DESCRIPTION OF THE DRAWINGS

FIG. 1 is a perspective view of a device useful in increasing the life of a cut flower in water, shown in position attached to the basal end of the flower stem;

FIG. 2 is an enlarged, cross-sectional view of the device of FIG. 1 taken along the line 2—2 of FIG. 1; and FIG. 3 is a graphical representation showing the effect of the method and device of the present invention in increasing the life of a cut flower in water.

DETAILED DESCRIPTION

Referring to FIG. 1 of the drawing, there is shown device 10 useful in the present method for increasing the life of a cut flower 11 in water. Device 10 (as seen in detail in FIG. 2) includes flexible tube or conduit 12, which receives stem 14 of flower 11 at one end and is disposable in water 18 at its opposite end. Water-porous, ion exchange resin mass 20 is contained within tube 12 such that water 18 must flow through resin 20 to reach the vascular system within stem 14. The method of the invention includes placing basal end 22 of stem 14 within tube 12 such that water 18 enters lower open end 23 of tube 12, passes through resin 20 and enters into the vascular system within the stem. Resin 20 and tube 12 each inhibit passage of water into the flower's vascular system and thus reduce physiological blockage of its water-conducting tissue. Resin 20 also removes harmful ions from water 18.

Tube 12 serves two functions: (1) it restricts the flow of water into basal end 22 of stem 14, and (2) it serves as a container for ion exchange resin 20. To this end, tube 12 preferably consists of a piece of flexible rubber tubing, approximately 1 in. in length and three-sixteenths in. in internal diameter. Tube 12 may be as short as three fourth in. or as long as 1 ¼ in. without substantially hindering operation of the device. A tube substantially longer is believed not to work any better. A tube substantially shorter is too difficult to manipulate. Tube 12 is open at both ends. At open upper end 24 there is disposed a plug, such as piece of gauze 26, and at open lower end 23, there is disposed another plug, such as piece of gauze 30. Gauze 26 is depressed about one-fourth in. from open upper end 24 while gauze 30 is located sustantially at open lower end 23. It is intended that basal end 22 of stem 14 be positioned within open upper end 24 of tube 12 and extend a distance of about one-fourth in. therein and that it encounter gauze 26. The internal diameter of tube 12 at open upper end 24 is slightly smaller than the external diameter of stem 14. Thus, the flexible rubber tube grips stem 14 as it is forcibly inserted within open upper end 24. The stem's basal end is accordingly securely held within open upper end of tube 12.

Alternatively, a glass or polyethylene vial could be used in lieu of rubber tube 12. As the vial is not flexible, a rubber stopper having a central aperture and insertable in one open end of the vial is used to receive and grasp the basal end of the stem. Plugs other than gauze are also suitable.

Ion exchange resin 20 restricts passage of water into basal end 22 of stem 14. Restricting passage of water into the flower's vascular system reduces physiological blockage of water conductive tissue. In addition, resin 20 removes a noxious ion or ions from water 18. Ion exchange resin 20 is contained within tube 12 and is held therein by pieces of gauze 26 and 30 at respective ends 24 and 23 of the tube. As tube 12 fits upon basal end 22 of stem 14, and as resin mass 20 occupies the tube's interior, forming a column, water 18 flowing into the stem's basal end must flow through resin 20.

Preferably, ion exchange resin mass 20 is an anion exchange resin. The resin should have a normal percentage of crosslinking so that it is relatively porous. The bead size should be relatively large, because the smaller the bead size, the more tightly packed the ion exchange column becomes and the more the water flow is impeded. Too much impedance will prevent an adequate flow of water to the flower's vascular system. One resin which has been found particularly suitable for the present purpose is sold under the name ANGA-542 and is distributed by J. T. Baker Chemical Company and manufactured by IONAC Chemical Company. This is a strongly basic, relatively porous resin. This resin is a styrene-divinylbenzine copolymer in bead form of about 16 to 50 mesh. Its functional group is an alkyl quaternary amine. It is also contemplated to use a mixed bed resin, i.e., an intimate 50—50 mixture of a anion exchange resin and a cation exchange resin. One resin which has been found suitable for this purpose is identified by the trade name ANGM-610 and is manufactured and distributed by the above-named companies. This ion exchange resin is both a strong acid and a strong base. It is also a styrenedivinylbenzine copolymer, but it has sulfonic and alkyl quaternary amine functional groups. It is in bead form of about 16 to 50 mesh.

It is believed that a pure anion exchange resin bed achieves better results than if a mixed bed ion exchange resin is employed. In any event, it is believed to be undesirable to employ a pure cation exchange resin for the purposes of the present invention.

Referring to FIG. 3 of the drawing, it can be seen that in an exemplary situation, a cut flower such as a rose will absorb a substantial amount of water and increase its weight for a period of several days. The flower will then begin losing weight as its vascular tissues become blocked. Within a period of about four to five days from the date of cutting, the fresh weight of the flower will ordinarily have returned to its original weight. Generally, a cut rose is considered "dead" when it returns to its original fresh weight. Thus, a flower is dead within 4 to 5 days. When device 10 of the present invention is employed, using an anion exchange resin, the cut flower continues to gain in fresh weight for a longer period of time and gains a greater amount of fresh weight than an untreated flower. Moreover, and more importantly, it continues to have a net positive change in fresh weight until at least eight days from the date of cutting. The flower is not considered dead until at least eight days after the cutting. The flower remains alive for at least three to four days longer than does a flower which has not been provided with ion exchange device 10. If a mixed bed ion exchange resin is employed in device 10, the flower does not gain quite as much fresh weight and loses its net positive change in a shorter period of time. If a cation exchange resin is employed, there is almost no difference in life than if device 10 is not used at all.

It is not known precisely how the anion exchange resin serves to increase the life of a cut flower, such as a rose. The theory of ion exchange is not completely understood. It is not known which ion or ions contained in water are harmful to the flower. Indeed, applicant's studies have shown that preserving a flower only in deionized water results in even a shorter life span than does leaving the flower in distilled water. Use of device 10 with anion exchange resin 20 permits a greater amount of water uptake into the vascular tissues of the flower than occurs with an untreated flower. The blockage rate is substantially decreased. Applicant believes that the combination of inhibiting the passage of water into the flower stem together with removal of a noxious ion substantially achieves the intended effect. Applicant's tests have shown that the results are not as good if there is no constriction to water movement. Preferably, this constriction is accomplished by placing tube 12 at the stem's base. The presence of resin 20 in tube 12 also obstructs water flow. It has been found that placing loose ion exchange resin beads in a container is not nearly as effective. However, incorporating the resin, typically in a cellulose material base, in a urea or phenol formaldehyde floral foam, such as that sold under the trademark "Oasis," may appreciably enhance the life of cut roses. On the other hand, applicant's tests have shown that the presence of the ion exchange resin is extremely important. Obstructing the flow of water alone does not have the same effect.

Device 10 is of even greater usefulness when water 18 is mixed with a preservative of the type ordinarily used in preserving flowers. This preservative preferably is a mixture of a sugar and a bacteriacide. It may also be of the type commercially available under the trademark "Floralife". Its manufacturer contends that such a preservative will by itself increase retention of water in cut roses. When combined with the effect of device 10, the preservative may increase the flower's life to as long as twelve days.

Applicant's tests have shown that certain substances which might appear to be substitutes for resin 20 are not effective. Use of sand in lieu of resin 20 does not promote retention of water and, indeed, results in precisely the opposite. Use of ascorbic acid also is not as effective as resin 20. However, use of ascorbic acid together with ion exchange resin results in a reduction of the blockage rate. It is believed that ascorbic acid does not itself significantly improve the effect of the ion exchange resin.

Many external factors have been found not to have any appreciable effect on the invention. The type of rose which is treated does not have any significance. Applicant has tested Golden Wave (yellow) roses, Red American Beauty (red) roses and Forever Yours (red) roses and has achieved equal results with all. It is known that when roses are cut after a period of light weather, they live somewhat longer than those that are cut after a period of dark weather. Proportional results have been achieved with the present invention. Proportional results have also been achieved depending upon the flower's condition.

EXAMPLE

Groups of ten cut Forever Yours red roses were treated as follows: (1) with device 10 incorporating an ion exchange resin and held in distilled water; (2) with device 10 and a floral preservative; (3) with a preservative; and (4) with deionized water. An additional control group was held in distilled water.

The group using device 10 and held in distilled water had a mean net gain in freah weight of about 23 percent 3 days after harvest and did not return to original fresh weight until 9 ½ days after harvest. When the flower returns to its original fresh weight, it is considered "dead." The group using device 10 and a floral preservative had a mean net gain in fresh weight of about 24 percent after 4 days and returned to original fresh weight more than 11 days after harvest. The group held in a floral preservative had a mean net gain in fresh weight of about 15 percent after 3 days and returned to original fresh weight more than 10 days after harvest. The control group held in distilled water had a mean net gain in fresh weight of about 10 percent after 2 days and returned to original fresh weight less than 5 days after harvest. Finally, the group held in deionized water had a mean net gain of less than 4 percent after 2 days and returned to original fresh weight about 3 days after harvest.

It is clear that device 10 is extremely effective in increasing water uptake, enhancing fresh weight retention and reducing plugging or blockage of vascular tissue. When a floral preservative is added to the water, and device 10 is employed, an even greater increase in life occurs. Distilled or deionized water alone is not effective.

Thus, it can be seen that the method and device of the present invention are particularly useful in increasing the life of a cut flower, such as a rose, in water. Fresh weight retention is considerably enhanced with the ion exchange column either in water or in a floral preservative in water. The combination of restricting the passage of water into the flower stem and requiring water to flow through an ion exchange resin mass, either an anion exchange resin or a mixed bed, considerably increases cut flower life. It further prevents "bent neck" in cut roses. Vase life is increased up to approximately 100 percent with this method over untreated flowers and by a substantial ammount over roses maintained in a floral preservative in water.

I claim:

1. In the method wherein the stem of a cut flower is immersed in water to preserve and/or increase the life of the cut flower, the improvement which comprises introducing the cut end of the flower stem into contact with water under conditions such that substantially all of the water enters the cut end only after passage through a mass of anion exchange resin or a mixed bed of anion exchange resin and cation exchange resin.

2. Method according to claim 1, further comprising the step of mixing a sugar and a bactericide with the water.

3. Method of increasing the life of and/or preserving a cut flower the stem of which is immersed in water, comprising the steps of:
   a. disposing a water-porous, anion exchange resin mass between the basal end of the stem and water such that water passes through the resin into the flower stem; and
   b. inhibiting the passage of water into the flower stem.

4. Device useful in increasing the life of and/or preserving a cut flower the stem of which is immersed in water, comprising a conduit having therein a mass of anion exchange resin or a mixed bed of anion exchange resin and cation exchange resin, at least one end of the conduit being adapted to receive flower stems of varying size, the conduit being disposable between the basal end of the flower stem and the water such that substantially all of the water enters the basal end only after passage through the resin mass.

5. Device useful in increasing the life of and/or preserving a cut flower the stem of which is immersed in water, comprising:
   a. tube means open at both ends, one end being adapted to receive the basal end of the flower stem and the opposite end being disposable in water;
   b. a water-porous, anion exchange resin mass located within the tube means between the first open end and the opposite open end such that water must pass through the resin into the stem's basal end; and
   c. at least a portion of the tube means being adapted to securely hold the stem's basal end adjacent the anion exchange resin mass.

* * * * *